United States Patent

[11] 3,622,607

[72] Inventor Donald M. Fenton
 Anaheim, Calif.
[21] Appl. No. 873,641
[22] Filed Nov. 3, 1969
[45] Patented Nov. 23, 1971
[73] Assignee Union Oil Company of California
 Los Angeles, Calif.

[54] PALLADIUM CHELATES HAVING A PALLADIUM-CARBON BOND
 10 Claims, No Drawings
[52] U.S. Cl. .................................................. 260/429 R,
 252/429 R, 252/431 P, 260/533 A, 260/429 J
[51] Int. Cl. .................................................. C07c 11/26
[50] Field of Search ........................................ 260/429

[56] References Cited
 OTHER REFERENCES
Coulson Chemical Communications, 1968, p. 1530–1531.
Bennett et al., Chemical Communications, 1967, p. 581–582.

Coates et al., Organometallic Compounds, Methuen and Co. Ltd., London, 3rd edition, 1968, Volume 2, pages 216, 217, 227.

Primary Examiner—Tobias E. Levow
Assistant Examiner—A. P. Demers
Attorneys—Milton W. Lee, Richard C. Hartman, Lannas S. Henderson, Dean Sandford and Robert E. Strauss ABSTRACT: A palladium chelate comprising palladium and a halide, alkanoate, or hydroxyl in a 4- or 5-membered ring with an aromatic biphyllic ligand. The chelate is an active catalyst in hydrocarboxylation reactions and demonstrates high selectivity for the production of straight-chain products. A typical chelate with chloride and triphenylphosphine is:

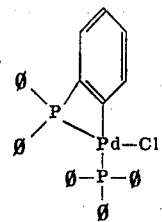

PALLADIUM CHELATES HAVING A PALLADIUM-CARBON BOND

DESCRIPTION OF THE INVENTION

The invention relates to a palladium chelate. More particularly, the invention relates to a palladium-biphyllic ligand chelate which has been found to be an improved catalyst for hydrocarboxylation of olefins in that it increases the yield of straight-chain products over than normally achieved.

It is known that palladium may be complexed with biphyllic ligands and with halides, carboxylates and amines, etc., to produce highly active complex catalysts. Such palladium complexes are disclosed in U.S. Pat. No. 3,102,899 wherein palladium is described as being in complex association with such ligands as tributylphosphite, tributylarsenite, triethylstibenite, carbon monoxide, tripropylphosphines, etc., and in Netherlands Pat. No. 6,407,121 wherein palladium is described as being in complex association with an organic phosphine or phosphite, ammonia, amine, nitrile or chloride.

These palladium complexes are known to be useful catalysts for hydrocarboxylation reactions wherein an olefin, carbon monoxide and water, carboxylic acid or an alcohol are reacted to yield an acid, anhydride or an ester. Although the prior art palladium complexes catalyze hydrocarboxylation reactions, an undesirable yield of branched-chain products occurs, with the yield of branched-chain products commonly being twice that of the desirable straight-chain product.

It is the principal object, therefore, of the invention to produce a catalyst which will increase the yield of straight-chain products in a hydrocarboxylation process.

It is another object of the invention to produce a hydrocarboxylation catalyst of greater activity and/or selectivity.

It is still another object of the invention to provide a novel palladium chelate.

Other objects will be apparent from the following description of the invention.

The chelate complex of this invention has the following general structure:

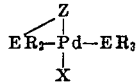

wherein E is a trivalent Group Va element having an atomic number of at least 15, e.g., phosphorus, arsenic, antimony or bismuth, preferably phosphorus;

R is the same or different alkyl, having one to 14 carbons, preferably three to 10 carbons, e.g., methyl, ethyl, butyl, nonyl, dodecyl, tetradecyl, etc.; cycloalkyl having from five to 10 carbons, e.g., cyclohexyl, methylcyclopentyl, cyclopentyl, cycloheptyl, cyclooctyl, etc.; or aryl having from six to 10 carbons, e.g., phenyl, tolyl, cumenyl, pseudocumenyl, xylyl, duryl, etc.; preferably aryl;

X is halide, hydroxyl, or alkanoate having two to about 12 carbons. The halides and alkanoates are exemplified by fluoride, iodide, acetate, propionate, butyrate, valerate, caproicate, enanthicate, caprylicate, caprirate, etc. Halides are preferred and chloride is a preferred halide; and Z is a mononuclear aryl or aryl orthomethylene or orthoalkylmethylene radical as defined by the formula:

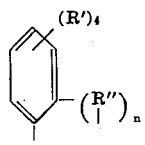

wherein $n$ is O or 1, R' is hydrogen or the same or different alkyl having 1 to about 3 carbons, and R" is methylene or alkylmethylene having one to four carbons. In the case where $n$ is O, Z is arylene, e.g., phenylene, and wherein $n$ is 1, Z is arylorthomethylene or arylorthoalkylmethylene.

It should be noted that the terms "aryl," "arylene" and "arylorthomethylene" used herein include the mononuclear $C_6$ aromatic ring structured hydrocarbon as well as the lower, $C_1$ to $C_3$ alkyl derivatives thereof.

Accordingly, the chelate of the invention is comprised of a 4- or 5-membered ring. The chelate having a 4-membered ring has the general formula:

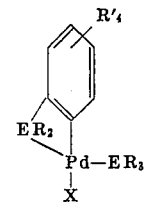

In this 4-membered chelate, preferably R' is hydrogen, X is halide or alkanoate, preferably chloride or acetate, and preferably $ER_3$ is a triarylphosphine whose aryl groups have six to about 10 carbons, preferably triphenylphosphine.

The following formulas exemplify 4-membered chelates specifically contemplated:

$\overline{C_6H_4PdP}(C_6H_5)_2ClP(C_6H_5)_3$
$\overline{C_6H_4PdP}(C_6H_5)_2BrP(C_6H_5)_3$
$\overline{C_6H_4PdAs}(C_4H_9)_2O_2CC_4H_9As(C_4H_9)_3$
$CH_3\overline{C_6H_3PdP}(C_6H_5)_2O_2CCH_3P(C_6H_5)_3$
$\overline{C_6H_4PdP}(C_6H_5)_2ClBi(C_4H_9)_3$
$(C_2H_5)_2\overline{C_6H_2PdSb}(C_3H_7)_2O_2CC_2H_5P(C_2H_5)_3$
$\overline{C_6H_4PdP}(C_6H_5)_2ClP(C_5H_{11})_3$
$\overline{C_6H_4PdP}(C_6H_5)_2OHP(C_6H_5)_3$
$(C_4H_9)_2\overline{C_6PdSb}(C_6H_5)_2OHSb(C_6H_5)_3$ The chelate having a 5-membered ring has the general formula:

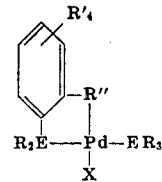

In the 5-membered chelate, preferably R' is hydrogen, R" is methylene, E is phosphorus, X is halide or alkanoate, preferably chloride or acetate and $ER_3$ is a triarylphosphine whose aryl groups have six to 10 carbons as the arylalkylene radical.

The following formulas exemplify 5-membered chelates specifically contemplated herein:

$\overline{C_6H_4CH_2PdP}(C_6H_5)_2ClP(C_6H_5)_3$
$\overline{C_6H_4CH(CH_3)PdP}(C_6H_5)_2OHP(C_5H_5)_3$
$\overline{C_6H_4CH_2PdSb}(C_3H_7)_2CO_2CO_2CH_3Sb(C_3H_7)_3$
$(CH_3)_2\overline{C_6H_2CH_2PdP}(C_6H_5)_2ClP(C_6H_5)_3$ The chelate structure formed has the trivalent Group Va atom as one dentate center with a nuclear carbon or an alkyl carbon vicinal thereto as the other dentate center. Bonding of the palladium to the carbon dentate center is by covalent sigma bonding while bonding to the trivalent Group Va atom is by coordinate covalent sigma bonding with back donation of an electron from the metal.

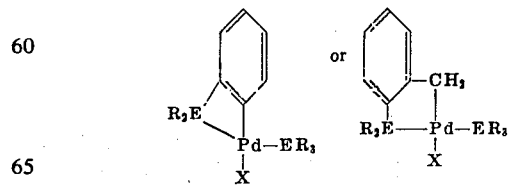

The chelates of the invention may be prepared by contacting palladium ion, a biphyllic ligand and a halide, hydroxyl, or alkanoate in the presence of an "acid acceptor," to be defined hereinafter. The reaction generally proceeds as illustrated below:

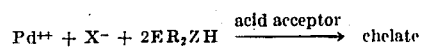

The palladium is generally added as a salt, preferably as a halide, hydroxide, or alkanoate, depending on the desired "X" component of the chelate. Suitable sources of palladium ion are palladium chloride, palladium iodide, palladium bromide, palladium acetate, palladium propionate, palladium valerate, palladium butyrate, etc.

The source of "X" may be any compound which on dissolution yields the X anions, e.g., acids, hydroxides or salts such as sodium hydroxide, potassium chloride, magnesium chloride, sodium acetate, potassium propionate, sodium nitrate, potassium butyrate, ammonium hydroxide, acetic acid, valeric acid, octanoic acid, etc., Preferably, for convenience, a palladium salt, e.g., palladium chloride, palladium acetate, etc., is used.

The arylene or arylalkylene group, designated "Z," may be added as a group on the biphyllic ligand, i.e., as $ER_2ZH$, wherein E, R and Z are as defined hereinabove. The liable hydrogen of the Z group, shown in empirical formula, is detached therefrom when "Z" is covalently bonded to palladium.

A biphyllic ligand is a compound having at least one atom with a pair of electrons capable of forming a coordinate covalent bond with a metal atom and simultaneously having the ability to accept the electron from the metal. Biphyllic ligands utilized herein comprise the ligands having the formula $ER_3$, wherein E is phosphorus, arsenic, antimony or bismuth, and wherein R is as defined hereinabove, e.g., butyl, cyclohexyl, phenyl, tolyl, etc., with at least one of the R groups being aryl. The remaining two R groups may be any of the hydrocarbons described hereinabove, e.g., butyl, cyclohexyl, tolyl, etc. For convenience, however, the R groups are preferably all aryl having the same number of carbons as the arylene or arylalkylene group of the desired chelate. Hence, preferably the biphyllic ligand supplies the source of "Z" as indicated hereinabove.

The chelate formation is performed under liquid phase conditions and can be conducted in the presence of a suitable inert liquid which is inert to the reactants and chelate under the contacting conditions and which preferably is a solvent for the reactants and chelate. Suitable liquids include hydrocarbons, carboxylic acids, ketones, ethers, esters and alcohols, etc. The preferred liquids are the $C_2$–$C_{20}$ carboxylic acids, e.g., acetic acid, propionic acid, butyric acid, pivalic acid, octanoic acid, benzoic acid, toluic acid dodecanoic acid, etc., preferably a $C_2$–$C_{12}$ fatty acid. Other suitable liquids are exemplified by hexane, heptane, benzene, toluene, acetone, methylethyl ketone, diisopropyl ketone, cyclohexanone, di-n-butyl ether, methyl m-tolyl ether, methyl acetate, ethyl n-butyrate, methanol, ethanol, propanol, butanol, octanol, etc. The $C_1$–$C_{12}$ alkanols, e.g., methanol, ethanol, propanol, etc., are preferred solvents when a hydroxyl-type chelate is to be synthesized.

The contacting is preferably conducted in the presence of an acid acceptor, i.e., a material which when added to an acidic solution, increases the pH of the solution. Suitable acid acceptors include the alkali and alkaline earth metal hydroxides, carbonates, arsenates, borates and oxides, e.g., sodium hydroxide, potassium hydroxide, calcium hydroxide, sodium carbonate, calcium oxide, lithium arsenate, sodium borate, cesium borate, etc., hydrazine, ammonium hydroxide, a $C_1$–$C_5$ alkyl amine, e.g., butyl amine, tripropyl amine, etc., and the alkali and alkaline earth metal $C_1$–$C_{12}$, preferably $C_2$–$C_5$, alkanoates, e.g., lithium acetate, sodium propionate, potassium pivalate, cesium butyrate, potassium acetate, lithium laurate, etc. The fatty acid carboxylates are generally preferred, and the hydroxides are most preferred acid acceptors when a hydroxyl-type chelate is desired.

The amount of acid acceptor employed is generally 0.5–30 weight percent, preferably 1–10 weight percent of the reaction medium and sufficient to form the chelate.

The chelate synthesis is preferably conducted in a nonoxidizing atmosphere. This can be accomplished, for example, by conducting the contacting in the presence of hydrogen, e.g., in the presence of from 0.1–60 atmospheres absolute hydrogen pressure or by adding hydrogen liberating components, e.g., sodium borohydride, lithium hydride, lithium aluminum hydride, etc., to produce hydrogen in situ. A nonoxidizing atmosphere may also be maintained by performing the contact in the presence of an inert gas such as carbon monoxide or nitrogen which can maintained in the vapor space above the liquid reaction medium.

The proportion of the above-described reactants are preferably controlled within limits to achieve the chelates of the invention. Generally the molar amounts of halide, hydroxyl, or alkanoate are 0.1–3 times, preferably 0.5–2.0 times the atomic quantity of palladium present. The amount of biphyllic ligand, e.g., triphenylphosphine, can be reacted in a molar amount from 1 to about 10 times the atomic quantity of palladium. The ligand is preferably used in excess, e.g., 10–300 percent, most preferably 50–300 percent of that stoichiometrically required to form the palladium chelate.

The contacting may be performed under mild conditions and may be accomplished in a relatively short period. The chelate may be formed at temperatures between about 80° and 200° C., preferably between 100° and 150° C. and at pressures from 1–60 atmospheres absolute, preferably 1–10 atmospheres, sufficient to maintain liquid phase. As previously mentioned the preferred nonoxidizing environment may be maintained by adding an inert gas, e.g., hydrogen, nitrogen or carbon monoxide to the reaction medium to provide the aforementioned pressures.

The identity of the particular "X" group associated with the chelate can result from the anions associated with the palladium source used in the reaction or can result from the choice of the particular acid acceptor or reaction solvent used in synthesis of the chelate. When a palladium halide, alkanoate or hydroxide is added to the reaction, as the source of palladium, "X" is, respectively, halide, alkanoate or hydroxyl in the chelate which is initially formed.

When alkanoate or hydroxyl groups are to be associated with palladium as the "X" group, the reaction can be performed in the presence of alkanoate of hydroxide acid acceptors or in the presence of a fatty acid such as aforementioned. If the palladium is added in association with a different anion, e.g., a halide, the reaction can be continued so that the ultimate product recovered is the chelate having hydroxyl or the alkanoate corresponding to the acid acceptor. In such instances continuing the reaction in the presence of the alkanoate acid acceptor or a fatty acid for a period in excess of about 30 minutes at 100°–150° C. will yield alkanoate palladium chelate as the major product. Similarly, continuing the contacting in the presence of a hydroxide as the acid acceptor for a period greater than about 2 hours at 100°–150° C. will insure production of the hydroxyl palladium chelate as the major product. In such instances, mixtures of the chelate bearing different "X" groups are formed, however the reaction period can be prolonged up to about 6 hours to achieve, ultimately, substantially complete conversion to the hydroxyl or alkanoate chelate. Conversely, when "X" is to be halide, and the acid acceptor is alkanoate or hydroxide, the contacting is preferably performed for a relatively short period, e.g., 5–20 minutes at 100°–150° C. to preclude any substantial degree of conversion to either the alkanoate or hydroxide.

As disclosed hereinabove, the chelates are particularly useful as catalysts in hydrocarboxylation reactions wherein an ethylenically unsaturated hydrocarbon, carbon monoxide and water, an alcohol, or a carboxylic acid are contacted under liquid phase reaction conditions to form an acid, ester, or anhydride. The reactants, solvents and reaction conditions are described in detail on pages 2–4, 7–9 and 13–14 of my copending application Ser. No. 802,218, incorporated herein by reference. The chelate is added in catalytic amounts, e.g. 0.001–10 weight percent, preferably 0.001–2 percent of the reaction medium.

In particular, as described in the copending application, it has been found advantageous to conduct the reaction in the presence of hydrogen. Generally hydrogen pressures of 1–60 atmospheres absolute, preferably 5–30 atmospheres, are sufficient. Hydrogen may be supplied by introducing gaseous hydrogen into the reaction zone or by generating hydrogen in situ by the addition of the aforementioned hydrogen liberating agents such as sodium borohydride, lithium aluminum hydride, lithium hydride, or hydrazine, etc. It has also been found advantageous to conduct the hydrocarboxylation process in a limited amount of a mineral acid as described in the copending application.

The following examples 1–5 will illustrate modes of producing the chelate of my invention and of utilizing the catalyst in a hydrocarboxylation reaction:

EXAMPLE 1

To a 500-milliliter flask were added 5 grams palladium chloride bistriphenylphosphine, 2 grams triphenylphosphine, 20 grams lithium acetate, 5 milliliters hydrazine hydrate and 400 milliliters acetic acid. The mixture was heated to and maintained at refluxing temperature, about 120° C., for 15 minutes with continuous stirring. A yellow solid was formed and the solid was removed from the flask and found to weight 3.5 grams. The yellow solid was heated and was found to decompose at a temperature of about 80–105°C. The compound was analyzed by infrared analysis and was identified as having the following structure:

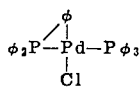

EXAMPLE 2

To a 500-milliliter flask were added 3 grams palladium chloride bistriphenylphosphine, 2 grams triphenylphosphine, 30 grams lithium acetate and 150 milliliters acetic acid. The mixture was heated to and maintained at reflux temperature, about 120° C., for about 1 hour while continuously stirring. The flask was allowed to cool and a greenish-yellow solid was observed to form. The solid was removed and weight about 3.0 grams. The solid wash heated and found to decompose at a temperature of about 130°–140° C. The compound was analyzed by infrared analysis to reveal that the compound had the structure

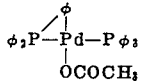

EXAMPLE 3

To a 500-milliliter flask were added 2.0 grams palladium chloride bistriphenylphospine, 3.0 grams triphenylphosphine, 7.0 grams potassium hydroxide and 200 milliliters of butanol. Nitrogen was bubbled through the mixture while the mixture was heated to and maintained at reflux temperature, about 120° C., for about 4 hours. The contents of the flask were allowed to cool and a greenish-yellow solid was observed to form. The solid was removed and weight about 1.5 grams. The solid was heated and was found to decompose at 140°–145° C. The compound was analyzed by infrared analysis to reveal that it had the structure:

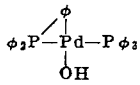

EXAMPLE 4

To a 250-milliliter flask were added 1.0 grams palladium chloride bis(triolylphosphine), 2.0 grams tri-o-tolylphosphine, 5.0 grams lithium acetate and 150 milliliters acetic acid. The flask was heated to and maintained at reflux temperature, about 120° C., for about 3 hours. The flask was allowed to cool and the contents removed. A solid product was recovered by filteration and was found to decompose at 260–280° C. The solid was analyzed by infrared analysis to reveal that a mixture of the following chelates was formed:

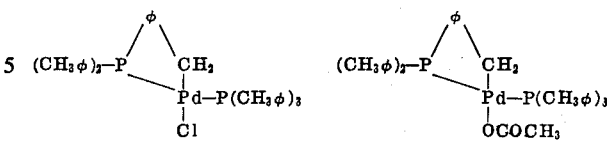

EXAMPLE 5

To a one-half gallon autoclave were added 1.5 grams of the chelate of example 1, 3 grams triphenylphosphine, 400 milliliters acetic acid, 15 milliliters water and 80 grams of 1-octene. The autoclave was pressured with carbon monoxide to 56 atmospheres and its contents were heated to and maintained at 120° C. for 2 hours with stirring. The autoclave was allowed to cool, then depressured and the liquid contents removed and analyzed. It was found that 35.9 grams of nonanoic acid and 8.2 grams of α-methyloctanoic acid were formed, the ratio of normal to branched-chain acid being 4.4.

The following example 6 illustrates the results obtained when a prior art catalyst is utilized in a hydrocarboxylation reaction.

EXAMPLE 6

To the one-half gallon autoclave were added 3 grams palladium chloride, 10 grams triphenylphosphine, 500 milliliters acetic acid, 10 grams water and 80 grams 1-octene. The autoclave was pressured with carbon monoxide to 42 atmospheres and then heated to and maintained at 125° C. for 2 hours. The autoclave was allowed to cool, then depressured and the liquid contents were removed. The contents were analyzed to reveal that nonanoic acid and α-methyloctanoic acid were formed with a ratio of the former to the latter of about 1.9, which compares unfavorably to that obtained in example 5 wherein the ratio of nonanoic nonanoic α-methyl-octanoic acids was 4.4.

The preceding examples 1–5 illustrate modes of producing and utilizing the chelate of this invention. Other Group Va elements, e.g., arsenic, antimony or bismuth; hydrocarbons, e.g., butyl, decyl, tolyl, cyclohexyl, etc.; halides, e.g., bromide iodide; carboxylates, e.g., butyrate, caprylicate; solvents, e.g., heptane, benzene, and acid acceptors, e.g., sodium butyrate, potassium carbonate, etc., may be substituted for those illustrated in the examples on an approximately equal molar basis without substantially changing the illustrated mode of practice. Similarly, the same procedure can be used for the synthesis of chelates using mono- and di-aryl biphyllic ligands such as di(n-butyl)phenylphosphine, ethyl dipseudocumenylphosphine, etc.

I claim:

1. A palladium chelate having the structure:

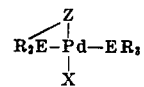

wherein E is trivalent group Va element having an atomic number of at least 15

R is the same or different alkyl having one to 14 carbons, cycloalkyl having five to 10 carbons or aryl having six to 10 carbons;

X is halide, hydroxyl, or alkanoate having two to about 12 carbons; and

Z is a mononuclear arylene, orthoarylmethylene or orthoarylakylmethylene radical having the structure:

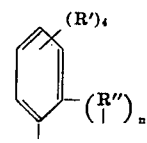

wherein $n$ is 0 or 1;

R' is hydrogen or the same or different alkyl having one to three carbons; and

R'' is methylene or alkylmethylene having one to about four carbons.

2. The chelate of claim 1 wherein E is phosphorus.
3. The chelate of claim 1 wherein X is halide.
4. The chelate of claim 1 wherein X is chloride.
5. The chelate of claim 1 wherein R is aryl having six to about 10 carbons.
6. The chelate of claim 5 wherein X is chloride and E is phosphorus.
7. The chelate of claim 6 wherein R is phenyl.
8. The chelate of claim 7 wherein Z is phenylene.
9. The chelate of claim 1 having a structure:

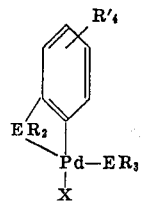

10. The chelate of claim 9 wherein R' is hydrogen, E is phosphorus, X is chloride or acetate and R is phenyl.